United States Patent [19]

Robinson

[11] Patent Number: 4,619,815

[45] Date of Patent: Oct. 28, 1986

[54] CHLORINATION OF IRON-CONTAINING METALIFEROUS MATERIAL

[75] Inventor: Michael Robinson, Wooton, England

[73] Assignee: SCM Chemicals Limited, London, England

[21] Appl. No.: 782,009

[22] Filed: Sep. 30, 1985

[51] Int. Cl.$^4$ .................. C01G 23/02; C01G 23/047
[52] U.S. Cl. ........................... 423/74; 423/79; 423/76; 75/1 T
[58] Field of Search ............ 423/74, 75, 76, 79; 75/1 T

[56] References Cited

U.S. PATENT DOCUMENTS

| | | | |
|---|---|---|---|
| 2,184,884 | 12/1939 | Muskat et al. | 423/75 |
| 3,865,920 | 2/1975 | Dunn | 423/74 |
| 3,870,506 | 3/1975 | Robinson et al. | 423/75 |
| 4,085,189 | 4/1978 | Dunn | 423/74 |
| 4,332,615 | 6/1982 | Dunn | 423/74 |
| 4,389,391 | 6/1983 | Dunn | 423/75 |

Primary Examiner—H. T. Carter
Attorney, Agent, or Firm—R. A. Sturges; T. M. Schmitz

[57] ABSTRACT

The process is directed to a fluidized bed chlorination of iron containing metaliferous materials to simultaneously produce a quantity of titanium beneficiate and a quantity of titanium tetrachloride. The process is controlled by maintaining the bed temperature between about 600° C. and 1150° C. while controlling the quantity of chlorine relative to the ratio of beneficiate to titanium tetrachloride desired.

13 Claims, No Drawings

CHLORINATION OF IRON-CONTAINING METALIFEROUS MATERIAL

This invention relates to the chlorination of iron-containing metaliferous materials and particularly to controlling the degree of chlorination of ores containing relatively high amounts of iron oxide.

Existing industrial processes directed to the chlorination of iron-containing metaliferous materials, such as ilmenite ore for example, have generally followed either the chlorination processes of partial chlorination (beneficiation) or total chlorination. In the partial chlorination process, iron values can be removed selectively from ilmenite ore for instance to produce a titanium dioxide beneficiate containing less than about 10% by weight of iron oxide values whereby the beneficate can be totally chlorinated to produce titanium tetrachloride. In the alternative total chlorination process, iron and titanium values in ilmenite ore for instance can be chlorinated simultaneously to produce a mixture of iron and titanium chlorides which are subjected to a separation process resulting in titanium tetrachloride of sufficient purity for use as a feed stock for the oxidation production of pigmentary titanium dioxide. The separated iron chlorides ordinarily are processed further to recover chlorine for reuse in the partial or total chlorination of iron-containing titaniferous materials.

A total chlorination process of ilmenite ore is described in British Pat. No. 1,481,120 where titanium tetrachloride is recovered from the chlorination gases in a 93% yield with respect to the titanium dioxide content of the ilmenite.

An ilmenite beneficiation process is described in U.S. Pat. No. 3,865,920 where iron values of the ore are recovered as iron oxide by the oxidation of the chlorination gases. The titanium dioxide content of the iron oxide, including that from titanium tetrachloride in the chlorination gases, was only 0.7% by weight of the titanium dioxide fed to the chlorinator.

Due to the overall exothermic nature of the reaction of titanium dioxide with chlorine, total chlorination processes such as that described in British Pat. No. 1,481,120, can be operated without recourse to a solids feed preheater. Any additional heat necessary can be generated by the combustion of carbon in the chlorination bed.

Beneficiation processes, such as that described in U.S. Pat. No. 3,865,920 require a solids feed preheater due to the relatively less exothermic nature overall of the reactions to produce a beneficiate stream. In this patent, varying the ferric chloride to ferrous chloride ratio of the beneficiator off-gases can greatly affect the heat generated by the beneficiation reaction and consequently the degree of ore preheat required. Regardless of the ratio of ferrous to ferric chloride, however, a solids feed preheater is necessary in beneficiation processes and is actually used according to U.S. Pat. No. 3,865,920.

Total chlorination and partial chlorination beneficiation plants are different from each other in respect to the absence or presence of a solids feed preheater and also in respect to the equipment needed to process the chlorination gases. In the case of total chlorination, means for separating the titanium tetrachloride from the iron chlorides in the effluent must be provided. In the case of benefication, means must be provided for the removal of a large flow of beneficiate from the chlorinator. Other differences will be apparent to those skilled in the art. Due to the specialization of industrial plants for either the total or partial chlorination process, such plants have been usable to cope with changes in conditions of supply and demand due, for example, to an increase or decrease in the demand for beneficiate or an increase or decrease in the demand for titanium tetrachloride in that plant.

It has now been found that the chlorination of iron-containing titaniferous ores can be operated in a single plant to produce both a good quality beneficiate and titanium tetrachloride for pigmentary use where the relative proportions of beneficiate and titanium tetrachloride produced can be adjusted within appropriate but wide limits by controlling the process in response to changing conditions of supply and demand. A particular advantage of this invention is that a solids feed preheater is not required, which is believed to be unique with respect to commercial production of beneficiate by chlorination without the use of a solids feed preheater. These and other advantages will become more apparent by referring to the detailed description of the inventions and the illustrative examples.

SUMMARY OF THE INVENTION

According to the present invention, the process provides for the simultaneous production of a metal oxide beneficiate and a metal chloride product from an iron-containing metaliferous material without the use of a solids feed preheater. The process comprises conducting a fluidized bed chlorination of a feed mixture of particulate solids comprising titaniferous or other metal oxide material mixed with carbon where the feed mixture contains about 15% to 40% by weight of carbon and fluidizing with a flow of chlorine having a concentration of from 25% to 70% by volume chlorine of the gases entering the fluidized bed. Bed solids are withdrawn from the fluidized bed while introducing the feed mixture of metal oxide material and carbon into the fluidized bed where the bed solids withdrawal and the feed mixture introduction are at relative rates, but having regard to the rate of removal of gaseous chlorides and bed blow-over from the bed in the bed effluent to maintain a substantially constant fluidized bed depth and to recover metal chloride e.g. titanium tetrachloride from the bed effluent of the process. The process is controlled firstly by supplying heat to maintain the bed temperature at from 600° C. to 1150° C. by introducing an oxidizing gas into the bed and combusting a proportion of the carbon therewith, and secondly, by controlling the oxidation state (ferric or ferrous) of the iron chloride produced by controlling the bed depth and finally, by controlling the quantity of chlorine introduced into the bed according to the expression:

$$Cl_2 = ACR_T - (ACR_T - ACR_B) \times \frac{B}{100}$$

wherein $Cl_2$ is the quantity of chlorine in liters per kilogram ore feed and B is the desired percent of feed ore appearing as beneficiate.

The concept of "actual chlorine requirement", denoted by the symbols ACR, is central to the invention. With respect to titaniferous materials, the ACR is defined as the quantity of chlorine per unit weight of the iron-containing titaniferous material required in theory to totally chlorinate that quantity of material ($ACR_T$), or to beneficiate that quantity of material ($ACR_B$), in accordance with the process with due allowance upwards for the amount of slip of unreacted chlorine through the bed and allowance downwards for blowover of bed solids which are unavailable for reaction. If the process is controlled as indicated, the relative chlorination rates of e.g. iron and titanium values are such that a beneficiation effect is obtained; provided, however, that the rate of feed and removal of ore solids is not so great as to impose a greater heat load on the system than can be sustained by the burning of coke with oxygen, and without introducing so much oxygen that it significantly lowers the quality of the product beneficiate with respect to iron content; and provided further that the rate of feed and removal of ore solids is not so small as to give practically complete reaction of the ore solids within the fluid bed lowering the quality of the product beneficiate with respect to its particle size which is, of course, desired to be itself fluidizable without large losses.

DETAILED DESCRIPTION OF THE INVENTION

Reference hereafter to fluidized bed depth is to the expanded bed depth unless the context requires otherwise.

It will be understood by those in the art that the conditions obtained in a fluidized bed chlorination process are to a great extent interdependent. Bed depth has an effect on the ferric chloride to ferrous chloride ratio and thus on the theoretical chlorine requirement, and on the amount of chlorine slip. Bed temperature will affect the bed depth required for a given ferric chloride to ferrous chloride ratio as well as the quality of carbon required to obtain the same degree of reactivity. The ferric chloride to ferrous chloride ratio will affect the reaction heat and therefore the amount of oxidizing gas which is required for an autothermal process. The total gas flow and feed rates of ore and carbon affect the blowover of the materials. Based on these interdependencies, the ACR can be ascertained for a given set of process conditions as in the accompanying table. In practice the amount of solids blow-over may vary from about 1% by weight up to about 10% by weight of the ore feed and the chlorine slip from zero up to about 2% by volume of the chlorine introduced into the fluidized bed.

According to a preferred aspect of the present invention, the proportion of the titanium dioxide of the ilmenite fed converted to beneficiate may be varied by variation of the quantity of chlorine fed to the bed within the limits set by the expression:

$$Cl_2 = ACR_T - (ACR_T - ACR_B) \times \frac{35-65 \text{ preferably} \times 40-60}{100}$$

within the approximate weight ratio of 35:65 to 65:35.

The iron-containing titaniferous material processed according to this invention can be in the form of an ore or a sand or other natural deposit, and preferably is ilmenite. The ilmenite may have an iron oxide content of about 30% up to about 70% by weight but preferably between 35% and 60% by weight. Western Australian ilmenite containing about 42% iron oxides, Australian Enaebba ilmenite containing about 36% oxides, or Indian ilmenite containing about 36% iron oxides, in each case calculated as $Fe_2O_3$ by weight, can suitably be processed according to this invention. The material is preferably in the size range 75 to 1000 microns.

The carbon used is preferably of similar particle size or slightly larger and can be, for example, in the size range of 75 to 2000 microns. The type of carbon used will depend on the chlorination temperature used. For chlorination temperatures above about 750° C., commercial grades of coke, such as petroleum coke, are satisfactory. Preferably the quantity of carbon is from 15% to 30% by weight of the carbon and of the iron-containing titaniferous material subjected to chlorine source gas. The flow of chlorine is preferably molecular chlorine diluted only with nonreactive gases and oxygen and the preferred concentration of the chlorine is between 30% and 55% by volume of the gases entering the fluidized bed.

The temperature of chlorination is preferably from 800° C. to 1100° C. particularly preferably from 850° C. to 1050° C., which can be maintained by the combustion of carbon in the fluidized bed by an oxidizing gas. Suitably the oxidizing gas is oxygen, if desired and depending on consideration of the concentration of the chlorine, in the form of air or of an oxygen/air mixture. Preferably the concentration of oxygen in the gases entering the bed is from 1% to 20% by volume and particularly preferred from 2% to 10% by volume.

The fluidized bed depth is typically from 1 meter to 4½ meters depending, as disclosed above, on whether it is desired to encourage the conversion of the iron values in the material to ferric or ferrous chloride. For ferrous chloride production the bed depth is preferably not significantly less than 3 meters. For ferric chloride production the bed depth is preferably less than 2 meters particularly preferably below 1.5 meters. For mixed ferric/ferrous chloride production an intermediate bed depth is preferably used.

The present process preferably is conducted continuously wherein the relation of solids input to and removal from the bed are essentially continuous flows.

Preferably the iron oxide content of the withdrawn bed material, the metal oxide beneficiate, after removing the residual carbon, is less than 10% by weight although it may be less than 5% by weight and for example from 0.5% to 4% by weight. Such a beneficiate is ideally suited to use as a raw material in a total chlorination process for the production of metal chloride e.g. titanium tetrachloride by virtue of its low iron oxide content, and further, because of the lowered content of other chlorinatable oxides, such as for example manganese, magnesium, aluminum and vanadium oxides occurring in the production of titanium metal. The collection or recovery of titanium tetrachloride from the gaseous effluent from the fluidized bed requires the preceding removal of its iron content.

There is much art relating to means for the removal of iron chlorides from fluidized bed chlorination effluents. The means adopted may depend on whether the iron chlorides are mainly in the ferric form in which case a simple condensation is possible or mainly in the ferrous form in which case it may be desired to convert it into the ferric form by treatment with chlorine. The iron chloride, in whatever form, may be fully oxidized to release chlorine for later recovery from the residual gases for example, by the process disclosed in British Pat. No. 664615 and the iron oxide can be removed by, for example, a cyclone. The particular means for the removal of iron values from the fluidized bed effluent gases is not a critical feature of the present invention. It suffices that the iron values are removed before the condensation of the titanium tetrachloride.

An illustrative example of the invention will now be specifically described.

The iron-containing titaniferous material to be processed was Western Australian ilmenite ore having the weight analysis as follows:

$TiO_2$ 55.2%
Iron (as $Fe_2O_3$) 41.6%
MnO 1.5%
$V_2O_5$ 0.3%
$Al_2O_3$ 0.9%
MgO 0.2%

$ACR_T/ACR_B$ Calculation. It is assumed that in total chlorination all of the above will react to form chlorides simple calculation giving a requirement for 1576 g $Cl_2$ per 1000 g of the ore for the formation of ferric chloride. This equals 524 "free liters" $Cl_2$ on the basis of 71 g $Cl_2$ = 23.6 free liters. It is assumed that in beneficiation no $TiO_2$, all of the $Fe_2O_3$, MnO and $V_2O_5$ and 50% of the $Al_2O_3$, MgO and "others" will react to form chlorides, simple calculation giving a requirement of 584 g $Cl_2$ per 1000 g of the ore for the formation of ferric chloride. This equals 194 "free liters" $Cl_2$. For 1000° C. operation and ferric chloride formation a very shallow bed would be used resulting in 3% wt. blow-over solids loss for total, which when fed from below with ore and coke results in 3% wt. blowover ore loss for total chlorination which is equivalent to a reduction in chlorine requirement of $(524-194) \times 0.03 \times 9.9$ free liters per kg ore fed. This is because the blowover from such a bed is beneficiated ore in course of reaction. Feeding the bed with solids from above gives a similar loss composed mainly of fresh ore, so then the reduction of chlorine requirement is $524 \times 0.03 = 15.7$ free liters per kg ore fed. During beneficiation on the other hand, if fed from below we would have zero reduction in chlorine requirement and if fed from above $195 \times 0.03 = 5.8$ free liters reduction per kg. ore fed.

Under the same operating conditions a slippage of chlorine occurs which is approximately 3% of the chlorine applied or an increased chlorine requirement of $524 \times 0.03 = 15.7$ free liters for total chlorination and $194 \times 0.03 = 5.8$ free liters for benefication.

A table is now given of estimations of ACR's for different chlorination conditions at c.1000° C. for a chlorinator of total height 3.66 m.

The apparatus used consists of a fluid bed chlorinator constructed of a fused silica tube 180 mm int. diam. and 3.66 m. in length arrange vertically in a gas fired furnace.

Means for metering and introducing fluidizing gases into the base of the unit are provided and means for removal and disposal of gaseous products of reaction from the top of the unit are provided, also means of sampling such gases prior to disposal.

Means for introducing premixed ore and coke are provided either from the top of the unit, or from below by means of conveying the feed materials into the unit by the fluidizing gas stream.

For runs where it is desired to remove bed while running, means for removing bed from the base of the unit without interrupting the flow of fluidizing gas are provided consisting of a pair of water cooled valves with interconnecting cooled pipework.

EXAMPLE 1

(Example of total chlorination alone, with ferric chloride byproduct not within the scope of the claims.)

The chlorinator was charged with 1 meter bed depth of a bed containing beneficiated ore and coke from a previous run, and heated to 950° C. while fluidized with nitrogen. Then 1.19 kg. of W. Australian ilmenite (55% $TiO_2$) and 0.30 kg. calcined petroleum coke were fed every 10 minutes taking 10 minutes to feed the increment, at the same time the fluidizing gases were 64 l/min. of Cl2 with 20 l/min air and 52 l/min nitrogen. The ore/coke mixture was fed into the fluidizing gas line so the bed was fed from below. The bed stabilized at 1000° C. and after several hours running was steady at 1.5 m deep and there was 2.2% Cl2 slip in total effluent gases. The feed was altered to be 1.23 kg of ore per 10 minutes and after several hours the bed depth was 1.2 m deep and there was 0.6% Cl2 slip in total. The CO/CO2 ratio was 0.8. Over the two parts of the run the Cl2/ore fed ratios were 538 and 520 free liters/kg ore fed, which bracket the target 530. The ferric chloride containing gases passed out of the effluent gas cooling tube without blockages forming. This is a preferred mode of running for this reason. A small sample of bed amounting to no more than 5% of the bed was withdrawn from time to time and this ore appeared to be somewhat finer in size than the feed ore as would be expected.

|  | Stoichiometric Cl2 Required | Ore blowover & Adjustment | Cl2 Slip & Adjustment |  |
| --- | --- | --- | --- | --- |
| Ore to Fluid Bed Fed from Below |  |  |  |  |
| Total Chlorination Alone |  |  |  | $ACR_T$ |
| Ferric chloride alone (shallow bed) | 524 | 3% of Ti, −10 | 3%, +16 | 530 |
| 50% Ferric + 50% Ferrous (int. bed) | 494 | 4½% of Ti, −15 | nil, nil | 479 |
| Ferrous Chloride alone (deep bed) | 462 | 6% of Ti, −20 | nil, nil | 442 |
| Beneficiation Alone |  |  |  | $ACR_B$ |
| Ferric chloride alone | 194 | n/a, nil | 3%, +6 | 200 |
| 50% Ferric + 50% Ferrous | 164 | n/a, nil | nil, nil | 164 |
| Ferrous chloride alone | 133 | n/a, nil | nil, nil | 133 |
| Ore to Fluid bed Fed from Above |  |  |  |  |
| Total Chlorination Alone |  |  |  | $ACR_T$ |
| Ferric chloride alone | 524 | 3% of total, −16 | 3%, +16 | 524 |
| 50% Ferric + 50% Ferrous | 494 | 4½% of total, −22 | nil, nil | 472 |
| Ferrous chloride alone | 462 | 6% of total, −28 | nil, nil | 434 |
| Beneficiation Alone |  |  |  | $ACR_B$ |
| Ferric chloride alone | 194 | 3% of total, −6 | 3%, +6 | 194 |
| 50% Ferric + 50% Ferrous | 164 | 6% of total, −10 | nil, nil | 154 |
| Ferrous chloride alone | 133 | 10% of total, −13 | nil, nil | 120 |

The method of application of the invention will now be illustrated by examples.

EXAMPLE 2

(Example of total chlorination alone with ferrous chloride by-product not within the scope of the claims)

The chlorinator was charged with 8 feet bed depth of a previous bed and heated to 950° C. while fluidized with N2. Then 1.28 kg of ilmenite (55% TiO$_2$) with 0.32 kg coke was added every 10 minutes over 10 mins into the fluidizing gas flow of 56 1/min of Cl2, 30 1/min of air, and 47 1/min of nitrogen. The temperature rose to 1000° C. and the bed depth after several hours running had stabilized at 2.0 m deep. There was not detectable Cl2 slip and the CO/CO2 ratio was 0.7. The Cl2/ore feed ratio was 438 which is close to the target 442 and indicates the blowover losses at that bed depth were slighly higher than estimated. The ferrous chloride containing gases passed out of the effluent gas cooling tube constantly depositing ferrous chloride and blocking it, necessitating frequent rodding out or the injection of the balance of the Cl2 into the tube to keep it clear. This is not a preferred form of running. Again small samples of the bed withdrawn from the unit from time to time showed the ore of the reacting bed to be noticeably finer in size than the feed ore as would be expected to be the case.

EXAMPLE 3

(Example of benefication alone with ferric chloride by product not within the scope of the invention).

The initial bed charge was 2 feed depth of an old bed heated to 950° C. whilst fluidizing with N2. Then 2.31 kg of ilmenite (55% TiO$_2$) with 0.58 kg coke was added every 10 mins. over 10 minutes into the top of the rig, while fluidizing with 40 1/min. Cl2, 20 1/min. air, and 38 1/min. N2. The bed temperature rose to 1000° C. and after the bed had built up to 4 feet depth (1.25 m) it was discharged to 1 m depth by means of the locking valves.

After several hours operation in this manner the Cl2 slip was approx. 1.2% (average) in total gas and the CO/CO2 was 0.24, which is indicative that a heavy heat load was being placed on the bed and that a solids preheater was desirable. Some TiCl4 formation was evident, and samples of the beneficiated ore later analyzed to contain 9.4% Fe2O3. The Cl2/ore feed ratio was 173 which is some way away from the target of 194. In an attempt to move closer to the target and obtain a better quality of beneficiate the ore feed rate was reduced to 2.1 kg ore over 10 mins. After a further time the run conditions had stabilized such that more copious fumes of TiCl4 were being produced and it was clear that beneficiation was taking place inefficiently with respect to TiO$_2$, i.e., that selectivity of attack had been lost.

This illustrates a principle known to those in the art that a good quality beneficiate cannot be made efficiently in a single pass whilst operating under ferric conditions.

EXAMPLE 4

(Beneficiation alone under ferrous chloride-forming conditions not within the scope of the invention).

The initial bed charge was 3 meters depth of bed from previous runs, heated to 950° C. fluidized with N2.

2.88 kg ilmenite (55% TiO$_2$) per 10 mins. every 10 mins and 0.72 kg coke were added via the unit top, and the fluidizing gases were 40 1/min. Cl2, 15 1/min. air, and 42 1/min. N2. The temperature rose to 990° C. and the top ductwork soon showed signs of blockages and rodding was needed to clear those, and then chlorine (15 to 20 1/min) was added to the chlorinator top to keep the unit clear. The bed depth was maintained at about 2.4 m deep by removing bed via the locking valves. There was no detectable Cl2 slip past the bed and the CO/CO2 ratio was 0.25 indicating that a heavy heat load was being placed on the bed. After 8 hours of running the product beneficiate was sampled and later found to contain 4% Fe2O3 (4.1, 3.8). The beneficiate was of generally good quality. The Cl2/ore feed ratio was 139 which is some way away from the target 120, Cl2 flow was reduced to restore the target figure but the CO/CO2 ratio moved to 0.12 and the bed started to drop in temperature. Additional air was added to the base of the unit to maintain temperature but it was clear that a preheater was needed. The last sample of beneficiates taken contained 9.7 and 11.2% Fe2O3.

Nevertheless, it is known from previous runs that this is a preferred method of running a beneficiation unit provided that the additional heat required can be introduced into the bed without affecting product quality e.g., by using a solids preheater, such as disclosed in commonly assigned U.S. Pat. No. 3,870,506 or U.K. No. 1,359,882.

EXAMPLE 5

(Mixed total chlorination and beneficiation ratio 1:1 falling within the scope of the claims, ferric chloride by product).

The initial bed was 6 feed deep bed from previous runs heated to 950° C.

The ore was fed from the top of the rig.

Feeds were 1.12 kg ilmenite (55% TiO$_2$) and 0.27 kg coke per 10 mins. over 10 mins and 40 1/min. Cl2, 15 1/min. air, and 42 1/min. N2. The bed temperature rose to 1000° C.

These conditions give Cl2/ore feed ratio fo 357 free liters/kg. ore which is midway between the Actual Cl2 Requirements of 524 for total chlorination under these conditions and 194 for beneficiation.

$$Cl2 = ACR_T - (ACR_T - ACR_B) \times \frac{50}{100}$$

$$= 524 - (524 - 194) \times \frac{1}{2}$$

$$= 359$$

(The actual value of 357 is obtained with 50½% inserted on the equation, rounding errors being involved).

After 20 running hours total running time conditions were steady averaging 0.2% Cl2 slip with 0.6 CO/CO2 ratio. The bed depth was approx. 1.2 to 1.6 m. The beneficiate made analyzed at 1.4% Fe2O3 content and generally of good quality.

Over 7½ actual hours 14.6 kg of product bed were made containing 10.9 kg beneficiate. Ilmenite fed was 33.8 kg which if entirely converted to beneficiate would have been 19.6 kg. The percentage of the product reporting as beneficiate was thus 56%.

This is only a little different from the target 50½% which is probably due to running with a lower than ideal Cl2 slip figure when Ferric Chloride by product is desired.

EXAMPLE 6

(Mixed total chlorination and benefication ratio 1:1 falling within the scope of the claims, ferric chloride by product).

Using the bed from Example 5, the conditions of Example 5 were repeated except that the bed depth was kept at 0.6 m to encourage the production of 1% Cl2 slip and hence ferric chloride by product which was checked by analysis and found to be the case.

After a further 10 hours running, conditions were steady and averaged 1.2% Cl2 slip and CO/CO2 0.5. The beneficiate made analyzed at 1.9% Fe2O3 and generally of good quality. Over 2¾ actual hours 7.4 kg. of product bed were made containing 5.5 kg beneficiate. Ilmenite fed was 17.9 kg which if entirely converted to beneficiate would have been 10.4 kg.

The percentage of the product reporting as beneficiate was thus 53%.

This is close to the target 50½%.

Running with ferric chloride by product gave no serious blockage problems with the effluent gas ductwork.

EXAMPLE 7

(Mixed total chlorination and beneficiation ratio 1:2 falling within the scope of the claims, ferric chloride byproduct).

The initial bed was the bed remaing from the previous example.

Again feeding from the top of the rig, feeds were 1.27 kg ilmenite (55% $TiO_2$) and 0.32 kg coke every 10 mins. over 10 mins. and gas flows were 40 l/min. Cl2, 15 l/min. air, and 42 l/min. N2. The bed temperature was 1050° C. The bed was kept at 0.6 m depth.

These conditions gave Cl2/ore feed ratio of 315 free liters/kg ore fed. This is approx. ⅔ of the way between 524 and 194 free liters required for total chlorination and beneficiation under these conditions.

$$Cl2 = 524 - (524 - 194) \times 0.67 = 303$$

(The actual value of 315 is obtained with 63½% inserted in the equation, rounding errors being involved).

After 12 running hours, the run conditions were steady averaging 0.9% Cl2 slip and CO/CO2 of 0.5. The beneficiate mode analyzed at 1.5% Fe2O3, and generally of good quality.

Over 6 actual hours 22.4 kg of product bed were made containing 16.6 kg beneficiate. Ilmenite fed was 44.5 kg which is converted entirely to beneficiate would have made 25.8 kg. The percentage of the product reporting as beneficiate was thus 64%, very close to the target 63½%. Running with ferric chloride by product gave no serious blockage problems with the effluent gas ductwork.

The foregoing examples are illustrative of the process of this invention directed to controlled fluidized bed chlorination of iron-containing metaliferous materials to produce a ratio of beneficiate to metal chloride within the range between 0.70 and 0.30 and preferably between 0.65 and 0.35; but are not intended to be limiting except as defined in the appended claims.

I claim:

1. A fluidized bed process for chlorinating iron-containing titaniferous ore to produce titanium dioxide beneficate and titanium chloride products, the process comprising:

providing a fluidized bed feed mixture comprising carbon and said titaniferous ore where said feed mixture contains by weight between 15% and 40% of said carbon;

maintaining the temperature of the fluidized bed at temperatures between 600° C. and 1150° C. by combusting a portion of said carbon with oxygen; and chlorinating said fluidized bed with a quantity of chlorine between the quantity required to beneficiate said titaniferous ore without substantial chlorination of titanium dioxide and the quantity required to totally chlorinate said titaniferous ore to produce beneficate and titanium chloride products in the weight ratio between 0.70 and 0.30 of beneficiate/titanium chloride products.

2. The process in claim 1 wherein the beneficiate/titanium chloride products weight ratio is between 0.65 and 0.35.

3. The process in claim 1 wherein the beneficiate/titanium chloride products weight ratio is between 0.60 and 0.40.

4. The process in claim 1 where the iron content of the iron-containing titaniferous ore is between 30% and 70% by weight.

5. The process in claim 1 where the bed depth is between 1 and 4½ meters.

6. The process in claim 5 where the bed depth is between about 2 and 3 meters and iron chloride is produced comprising ferrous chloride and ferric chloride.

7. The process in claim 5 wherein the depth of the fluidized bed is controlled by removing beneficiate from the fluidized bed.

8. The process in claim 7 where iron chloride is produced and the oxidation state of iron chloride is controlled by controlling the depth of the fluidized bed.

9. The process in claim 1 where the bed depth is greater than 3 meters.

10. The process in claim 9 where an iron chloride is produced and said iron chloride is substantially ferrous chloride.

11. The process in claim 1 where the bed depth is less than 2 meters.

12. The process in claim 11 where an iron chloride is produced and said iron chloride is substantially ferric chloride.

13. The process in claim 1 wherein the titanium chloride product is substantially titanium tetrachloride.

* * * * *